J. M. WEED.
WELDING ELECTRODE.
APPLICATION FILED SEPT. 6, 1919.
1,330,563.
Patented Feb. 10, 1920.
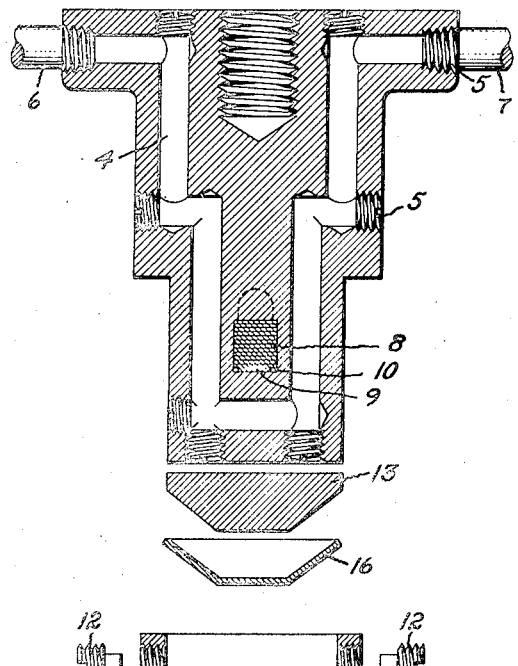
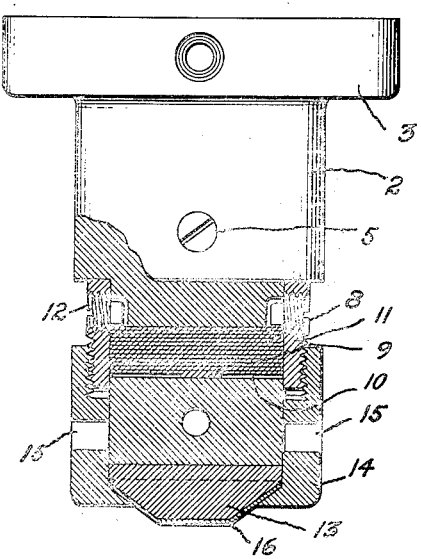
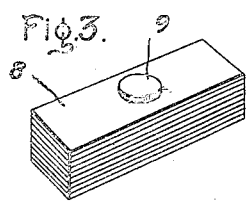
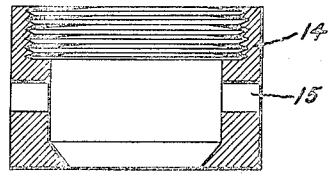
Inventor:
James M. Weed,
by *[signature]*
His Attorney.

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

WELDING-ELECTRODE.

1,330,563.   Specification of Letters Patent.   Patented Feb. 10, 1920.

Application filed September 6, 1919. Serial No. 322.071.

*To all whom it may concern:*

Be it known that I, JAMES M. WEED, a citizen of the United States, residing at Schenectady, in the county of Schenectady, State of New York, have invented certain new and useful Improvements in Welding-Electrodes, of which the following is a specification.

The present invention comprises an improvement in electric resistance welding electrodes, and particularly relates to spot welding electrodes.

It is the object of my invention to provide an electrode suitable for welding heavy parts involving the use of high mechanical pressures and heavy welding currents. In my previous Patent No. 1,304,277, patented May 7, 1919, I have described a welding electrode having a separable tip held into engagement with the main body of the electrode by means of a clamp. When the tip becomes deformed by reason of the pressure and high temperature used in welding it may be readily removed and either dressed or replaced with a new tip. While there is great advantage in being able to easily replace an inexpensive tip instead of replacing the whole electrode, experience has shown that the electrode tip becomes hotter and deforms more quickly when separable than when a unitary part of the electrode body unless good thermal conductivity is continuously maintained between the tip and the body. The tip being in contact with the material which is being welded during the welding operation, becomes heated therefrom, and the heat from consecutive welding operations tends to be cumulative unless the heat is discharged from the tip to the electrode body during the time intervals between welds. I have found that a clamp such as is shown in my prior patent for attaching the tip to the electrode body does not always afford a contact between them which is sufficiently intimate to give the necessary thermal conductivity.

In accordance with my present invention this difficulty is overcome by providing suitable mechanical means such as a spring for continuously exerting pressure between the welding tip and the main body of the electrode.

In the accompanying drawings, Figure 1 shows an assembled welding head partly in section, embodying my invention; Fig. 2 is a sectional view taken at right angles to Fig. 1, showing the various parts of the welding head separated from each other, and Fig. 3 is a perspective view of the spring.

As shown in Fig. 1 the welding electrode comprises a shank or stem 2 provided with a shoulder 3, which is adapted to be mechanically attached to the welding machine and electrically connected to suitable supply conductors. As shown in Fig. 2, the electrode is provided with conduits 4 carrying a cooling fluid, preferably water. The openings made in the electrode by the entry of the drill forming the conduits are closed by screw-threaded plugs 5, as indicated in the drawing. Nipples 6 and 7 are provided for the supply and discharge of the cooling fluid. A laminated spring 8 extends transversely through the electrode body, as indicated in Figs. 1 and 2, and rests upon a centrally located pivot 9 so as to leave a clearance space 10 between the ends of the spring and the adjacent part of the electrode body. Surrounding the electrode body adjacent the spring is a screw-threaded ring 11 provided with screw-threaded holes into which are fitted plugs 12 having a shoulder resting upon the ends of the spring 8. Engaging with the screw threads on the ring 11 is a clamp 14 which is shaped at its lower end to engage with the welding tip 13 when screwed upon the ring 11, for example, by a spanner wrench inserted into the opening 15, thereby flexing the spring 8 and forcing the welding tip 13 into close mechanical and thermal contact with the main body of the electrode. In some cases a welding tip is provided with a thin cap 16 consisting of copper, or other suitable metal, so that when deformation occurs due to the welding pressure the cap 16 may be readily and cheaply replaced. This cap 16 is distinguished from the separable welding tip 13, however it is not essential and may be omitted if desired.

It will be observed that due to the action of the flexed spring, the welding tip is continuously forced into contact with the water-cooled parts of the electrode even though all the parts of the apparatus have not been mechanically fitted to each other with the greatest nicety and even though the electrode tip becomes somewhat deformed due to use.

What I claim as new and desire to secure by Letters Patent of the United States, is:—

1. A resistance welding electrode comprising a body having a high heat capacity, a removable welding tip and resilient means for continuously pressing said tip against said body.

2. A resistance welding electrode comprising a welding head, a separable tip, a clamp for holding said tip into contact with said head and a spring for exerting pressure when flexed between said tip and head.

3. A resistance welding electrode comprising a welding head, a separable tip therefor, a laminated spring extending through said head, a threaded ring having a shoulder engaging with said spring, a screw-threaded clamp to flex said spring when the screw-threads of said cap are forced into engagement with the screw-threads of said ring thereby maintaining a good thermal contact between said tip and said welding head.

In witness whereof, I have hereunto set my hand this 5th day of September 1919.

JAMES M. WEED.